May 15, 1962 W. E. TURK ET AL 3,035,196

TELEVISION CAMERA TUBES

Filed June 1, 1959

INVENTORS
Walter Ernest Turk
and
Percy Charles Ruggles
BY Baldwin & Wight
ATTORNEYS United States Patent Office
3,035,196
Patented May 15, 1962

3,035,196
TELEVISION CAMERA TUBES
Walter Ernest Turk and Percy Charles Ruggles, Chelmsford, England, assignors to English Electric Valve Company Limited, London, England, a British company
Filed June 1, 1959, Ser. No. 817,124
Claims priority, application Great Britain July 10, 1958
4 Claims. (Cl. 313—65)

Figure 8:
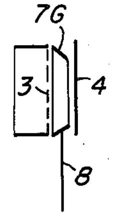

This invention relates to television camera tubes and more specifically to television camera tubes of the kind in which optical images are translated into electric charge images on a target electrode which is scanned through a mesh electrode adjacent and parallel thereto by a scanning electron ray to derive picture signals by picking off the charges. The principal, though not the exclusive application of the invention is to television camera tubes of the vidicon type. In these tubes an optical image to be televised is focused on to a photo-conductive layer deposited on a transparent conducting signal plate which, latter in operation, is held at a positive potential. In each television frame period a scanning electron beam scans the photo-conductive surface with a television raster thus picking off the charges and restoring the potential of this surface to the potential of the cathode of the electron gun. Where light falls on the photo-conductor, it becomes electrically conducting and as a result the surface of the photo-conductive layer charges up in a positive direction in each frame period towards the potential of the signal plate. At the end of each frame period a new scanning takes place to restore the surface again to gun cathode potential and thus re-establish full potential difference across the photo-conductor. The scanning electron beam is usually focused and deflected for scanning purposes by electro-magnetic means external to the tube. It is a requirement for proper operation that the scanning electron beam shall impact the photo-conductive surface at right angles thereto. In practice, however, unavoidable imperfections, principally in the yokes of the normally provided magnetic focusing and deflection coils, often introduced a radial component of velocity to the electrons of the scanning electron beam, and accordingly, when deflection occurs, the beam does not impact the target always perpendicularly and in consequence variation in beam landing velocity occurs across the scanned area. This is a serious defect and results in considerable distortion of the output signals there being a first order effect on signal variation over the picture.

The object of the present invention is to reduce or eliminate the foregoing defect.

According to this invention a television camera tube of the kind in which optical images are translated into electrical charge images on a target electrode which is scanned through a mesh electrode adjacent and parallel thereto by a scanning electron beam is provided with an electrostatic focusing electrode which is positioned between said mesh electrode and said target and which is either provided with an electrical connection whereby an independent potential may be applied thereto or is mechanically and electrically united either with the mesh electrode structure or with the target electrode structure, having, in the former case, at least a portion of its length constituted by a tapered ring which is co-axial with the mesh and convergent in the direction of the target.

A focusing electrode provided in accordance with this invention is dimensioned and arranged in such manner that despite imperfections in the normally provided ray focusing and/or ray deflection means, the beam is caused always to impact the target at right angles thereto. Where the focusing effect required to achieve this result is such as to counter balance an outward radial component of electron movement, it is preferably mechanically and electrically united with the structure of the mesh electrode. In the opposite case, i.e. where it is required to counterbalance an inward radial component of electron movement, it is preferably united with the target.

Figure 1:
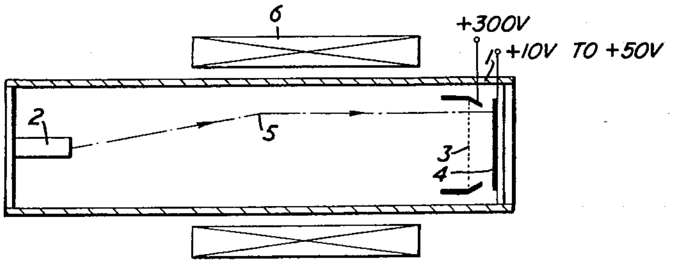

The invention is illustrated in and further explained in connection with the accompanying drawings in which FIGURE 1 is a highly simplified schematic representation of a known vidicon tube, and FIGURES 2 to 8 inclusive illustrate different embodiments of this invention showing different examples of the forms which a focusing electrode provided by this invention may take.

Figure 2:
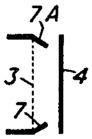
Figure 9:
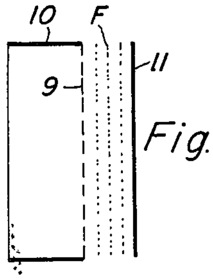
Figure 10:
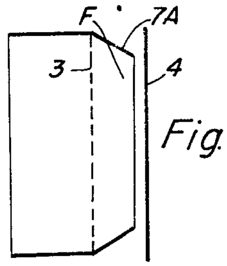

FIGURES 9 and 10 are examples of the prior art and the embodiment of FIGURE 2, respectively, to a larger scale showing the field gradient between the target electrode and the adjacent electrode.

Referring to FIGURE 1, the vidicon tube therein schematically represented comprises an envelope 1 with an electron gun represented by the rectangle 2 at one end, a photo-conductive target structure at the other and a mesh electrode 3 adjacent and parallel to the target electrode and between the same and the gun. FIGURE 1 is purely schematic and no attempt has been made therein to show the tube correctly to scale or in any detail. The photo-conductive layer of the target structure is represented merely by the line 4. As is well known, pictures to be televised are optically projected through the transparent target end of the tube and the said target is scanned by a scanning electron beam represented by the chain line 5 to develop picture signals. Electro-magnetic beam focusing and deflection coil systems as known per se are represented conventionally by the crossed rectangles 6. It is, as already stated, a requirement for correct operation that the beam 5 shall impact normally, i.e. perpendicularly on the target structure in all positions of deflection, but in practice, due to unavoidable imperfections of manufacture, a radial component of velocity is often imparted to the electrons of the beam.

In accordance with this invention this defect is avoided by providing a focusing electrode between the mesh electrode 3 and the target structure. The said focusing electrode may be an entirely independent ring-like electrode with its own connector for enabling a suitable potential to be applied thereto or it may be mechanically and electrically united either with the mesh electrode structure or with the target structure according to whether it is required to counterbalance an undesired outward radial component or an undesired inward radial component. Where it is united with the mesh at least a portion of its length should taper down in the direction of the target. Typical voltages which might be applied to these electrodes are of the order of +300 volts to the mesh electrode and a potential approximately in the range of from +10 to +50 volts to the target electrode, these potentials being with reference to the electron gun cathode. The spacing between the mesh electrode and the target in a typical vidicon camera tube is ⅛ inch.

Figure 3:
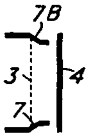

FIGURES 2 and 3 illustrate embodiments of the invention providing focusing to counterbalance an outward radial component of electron velocity and wherein the focusing electrode is united with the mesh. In each of these figures only the photo-conductive signal electrode layer and the mesh electrode, modified by the addition of the focusing electrode, are shown. In both FIGURES 2 and 3 the mesh electrode is given the reference 3 and the photo-conductive signal electrode layer is referenced 4. The focusing electrode provided by this invention is marked 7A and 7B in FIGURES 2 and 3 respectively. As will be seen in FIGURE 2 the focusing electrode 7A is frustro-conical converging in the direction of the target. In FIGURE 3 electrode 7B is partly divergent frustro-conical as in FIGURE 2 but with a short cylindrical extension in the direction of the target.

Figure 4:
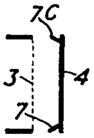
Figure 5:
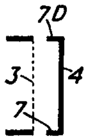
Figure 6:
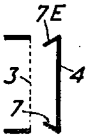
Figure 7:
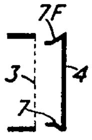

FIGURES 4 to 7 inclusive show in manner similar to that adopted for FIGURES 2 and 3, embodiments in which a focusing electrode, adapted to provide a focusing effect to counterbalance an inward radial component of electron velocity is united with the target. Here the focusing electrode is referenced 7C through 7F. In FIGURE 4 the focusing electrode is frustro-conical with a taper diverging out in the direction of the mesh; in FIGURE 5 it is cylindrical extending towards the mesh; in FIGURE 6 is is frustro-conical with a taper diverging out in the direction of the mesh; in FIGURE 5 it is cylindrical extending towards the mesh; in FIGURE 6 it is frustro-conical with a taper in the direction of the mesh; and in FIGURE 7 it is convergent frustro-conical, as in FIGURE 6, with a cylindrical extension towards the mesh.

FIGURE 8 shows another illustrative embodiment of this invention in which the focusing electrode 7G is physically and electrically isolated from both the mesh electrode 3 and the target electrode 4. A conductor 8 is connected to electrode 7G for applying a distinct electrical potential thereto.

FIGURE 9 shows the structure and the resultant electrostatic field gradient (in dotted lines labeled F) of devices known in the art, such as Schneeberger Patent 2,879,400. A mesh electrode 9 is mounted on the edge of focusing electrode 10 nearer the target electrode 11. The electrostatic field gradient between the mesh electrode 9 and the target electrode 11 is represented by a series of parallel dotted lines, labeled F. These parallel lines represent a uniform gradient between the electrodes. Because the gradient is uniform, it would have no corrective effect on electrons having a radial component, which electrons pass through the mesh electrode in the general direction of target 11.

FIGURE 10 shows the embodiment of FIGURE 2 to a larger scale. The field gradient lines F of this embodiment are distorted in the region between the electrode 7A and the target 4. This distorted field tends to counteract the radial components of electrodes passing through the focusing electrode 7A toward the target 4.

We claim:

1. A television camera tube of the kind in which optical images are translated into electrical charge images on a target electrode which is scanned through a mesh electrode adjacent and parallel thereto by a scanning electron beam, said tube being provided with a mesh electrode, a target at one end of said tube and an electrostatic focusing electrode positioned between said mesh electrode and said target.

2. A television camera tube of the kind in which optical images are translated into electrical charge images on a target electrode which is scanned through a mesh electrode adjacent and parallel thereto by a scanning electron beam, said tube being provided with a mesh electrode, a target at one end of said tube and an electrostatic focusing electrode which is positioned between said mesh electrode and said target and mechanically and electrically united with the mesh electrode structure, said focusing electrode having at least a portion of its length constituted by a tapered ring which is co-axial with the mesh and convergent in the direction of the target.

3. A television camera tube of the kind in which optical images are translated into electrical charge images on a target electrode which is scanned through a mesh electrode adjacent and parallel thereto by a scanning electron beam, said tube being provided with a mesh electrode, a target at one end of said tube and an electrostatic focusing electrode positioned between said mesh electrode and said target and mechanically and electrically united with the target electrode structure.

4. A television camera tube according to claim 1, wherein said focusing electrode is electrically and mechanically isolated from said mesh electrode and said target, said focusing electrode being coaxially aligned with said mesh electrode and including conductor means for applying an independent potential to said focusing electrode.

References Cited in the file of this patent

UNITED STATES PATENTS

| | | |
|---|---|---|
| 2,826,714 | Forgue | Mar. 11, 1958 |
| 2,879,400 | Schneeberger | Mar. 24, 1959 |